United States Patent [19]

Gillern

[11] 4,034,012
[45] July 5, 1977

[54] ACETONE-FORMALDEHYDE-RESORCINOL RESIN COMPOSITIONS AND ADHESIVES PREPARED THEREFROM

[75] Inventor: M. Frank Gillern, Seattle, Wash.

[73] Assignee: Weyerhaeuser Company, Tacoma, Wash.

[22] Filed: Mar. 17, 1975

[21] Appl. No.: 559,083

[52] U.S. Cl. .............................. 260/828; 260/838
[51] Int. Cl.² ......................................... C08L 61/00
[58] Field of Search ............... 260/828, 50, 54, 838

[56] References Cited
UNITED STATES PATENTS

| | | | |
|---|---|---|---|
| 2,398,331 | 4/1946 | Rust et al. | 260/50 |
| 2,538,883 | 1/1951 | Schrimpe | 260/828 |
| 2,538,884 | 1/1951 | Schrimpe | 260/828 |

Primary Examiner—J. Ziegler

[57] ABSTRACT

Disclosed are liquid, hydrophilic, 2-stage resin compositions produced by reaction of (1) an acetone-formaldehyde resin, (2) free formaldehyde, and (3) resorcinol in an aqueous solution at elevated temperatures at least until substantially all the free formaldehyde is consumed. The molar quantities of chemically combined acetone, A, and formaldehyde, $F_c$, in the acetone-formaldehyde resin and the molar quantities of free formaldehyde, $F_f$, and resorcinol, R, satisfy the equations $F_c/A = 1.5$ to $3.0$, $F_f/R = 0.2$ to $1.2$ and $R/A = 3.0$ to $5.0$. Also disclosed are adhesives prepared by combining such resin compositions with a curing agent such as formaldehyde. These adhesives cure rapidly to an insoluble infusible state in the absence of applied heat.

43 Claims, No Drawings

ACETONE-FORMALDEHYDE-RESORCINOL RESIN COMPOSITIONS AND ADHESIVES PREPARED THEREFROM

BACKGROUND OF THE INVENTION

This invention relates to processes for the preparation of acetone-formaldehyde-resorcinol resin compositions, to the resins so prepared, to adhesives prepared therefrom and to methods of using such adhesives.

It is an object of this invention to provide 2-stage acetone-formaldehyde-resorcinol resins that are hydrophilic and thus water-washable; are storage stable for extended periods of time; and can be combined with curing agents such as formaldehyde to yield adhesives that cure rapidly to an insoluble, infusible state at an ambient temperature of 25° C. Another object is to provide adhesives that will form high-strength, durable bonds to wood and other porous substrates. A further object is to provide adhesives the cure speeds of which can be conveniently varied by varying the pH thereof.

SUMMARY OF THE INVENTION

The foregoing and other objects are realized by one or more aspects of this invention wherein one aspect is directed to acetone-formaldehyde-resorcinol resins prepared by reaction of (1) an acetone-formaldehyde resin, (2) free formaldehyde, and (3) resorcinol in an aqueous solution and at a temperature of at least 50° C. at least until substantially all the free formaldehyde is consumed, the molar quantities of chemically combined acetone, A, and formaldehyde, $F_c$, in the acetone-formaldehyde resin and the molar quantities of free formaldehyde, $F_f$, and resorcinol, R, satisfying the equations $F_c/A = 1.5$ to 3.0 (preferably 1.8 to 2.7 and more preferably 2.0 to 2.5), $F_f/R = 0.2$ to 1.2 (preferably 0.3 to 1.0 and more preferably 0.4 to 0.8) and $R/A = 3.0$ to 5.0 (preferably 3.5 to 4.5).

This invention is also directed to adhesives produced by combining resin compositions of this invention with a curing agent, such as formaldehyde or a polymer thereof, the amount of resin composition and curing agent being sufficient to cause the adhesive to become insoluble and infusible in the absence of applied heat at an ambient temperature of 25° C. It is preferred that these adhesives have a pH of less than 4 and more preferably less than 3.

DETAILED DESCRIPTION OF THE INVENTION AND PREFERRED EMBODIMENTS

For the sake of brevity, acetone-formaldehyde resins are sometimes herein referred to as "AF resins," and the acetone-formaldehyde-resorcinol resins of this invention are sometimes referred to as "AFR resins."

AF RESINS

In the preferred method of preparing AF resins used in this invention, a base, which is preferably an alkali metal hydroxide and most preferably sodium hydroxide, is added to a mixture of acetone and formaldehyde. The formaldehyde:acetone mole ratio in the mixture is typically in the range of from 2.0 to 5.0 and more preferably in the range of from 3.5 to 4.5. Because the reaction of acetone and formaldehyde under alkaline conditions is very exothermic, it is preferable to add the base to the acetone-formaldehyde mixture at low temperatures and maintain the reaction mixture at temperatures in the range of from 40° to 70° C. during the exotherm. In order to maintain control of the exothermic reaction, the base should not be added all at one time, but rather should be added incrementally. The base is consumed during the course of the reaction and the final AF resin normally has a nearly neutral pH. The degree of advancement of the AF resin appears to be directly related to the amount of base employed. Preferably, the amount of sodium hydroxide employed is about 0.004 mole per mole of total formaldehyde, $F_t$, used in the preparation of the AF resin. If too much sodium hydroxide is used the AF resin will gel. In one instance, where the $F_T/A$ ratio was 4.0, the use of 0.0055 mole of sodium hydroxide per mole of formaldehyde did cause gelation to occur.

The amount of chemically combined formaldehyde in the final AF resin can be determined by measuring the free formaldehyde content of the resin and calculating the amount of combined formaldehyde (i.e., $F_c = F_T - F_f$). As indicated previously, the $F_c/A$ ratio in the AF resin should be from 1.5 to 3.0 (preferably 1.8 to 2.7 and more preferably 2.0 to 2.5.)

It is preferred but not essential that the amount of formaldehyde mixed with the acetone be substantially more than that which is to be reacted with the acetone so that the final AF resin composition contains a relatively large amount of free formaldehyde (typically from 10 to 20% by weight of the composition.) This free formaldehyde is then reacted with resorcinol in the preparation of the AFR resins of this invention as described below.

AFR RESINS

It has been found that if too little resorcinol is admixed with acetone-formaldehyde resins containing substantial amounts of free formaldehyde, the resulting mixture will gel immediately or in a short period. This is thought to be due to formation of high molecular weight resorcinol-formaldehyde polymers. Gelation occurs more rapidly if the mixtures are heated. The minimal amount of resorcinol needed to avoid gelation and produce storage-stable resins appears to increase with increasing $F_c/A$ ratios in the AF resin and to decrease with increasing degree of advancement of the AF resin. It is generally true however that if sufficient resorcinol is used so that the $F_f/R$ ratio is not in excess of 1.2, the AFR resins produced will be storage stable for long periods of time and will also be substantially non-thermosetting. Therefore, the $F_f/R$ ratios used in the preparation of the AFR resins of this invention are from 0.2 to 1.2 (preferably 0.3 to 1.0 and more preferably 0.4 to 0.8.)

To obtain AFR resins that cure rapidly when combined with a curing agent such as formaldehyde at ambient temperature, the resorcinol:acetone ratio (R/A) should be at least 3 and preferably at least 3.5. Although the cure speed of the AFR resins generally increases as the amount of resorcinol increases, the R/A ratio in the AFR resins of this invention should not exceed 5.0 and preferably does not exceed 4.5.

Although the AF resin, formaldehyde and resorcinol can be combined in any order, it is preferable to slowly add the AF resin containing the required amount of free formaldehyde to the resorcinol dissolved in methanol, ethanol, or isopropanol. This method assures that during reaction of resorcinol with the free formaldehyde, an excess of resorcinol will be present and that localized gelling of the reaction mixture will be avoided. Resorcinol can be added to the free formaldehyde containing AF resin, but localized gelling of the reaction mixture sometimes occurs. The presence of methanol, ethanol or isopropanol in the reaction mixture reduces the tendency for localized gelling and also appears to improve the hydrophilicity of the final resin.

When the AF resin, free formaldehyde and resorcinol have been combined, the reaction mixture is heated to and maintained at a temperature of at least 50° C. until substantially all free formaldehyde is consumed, i.e., the composition contains less than 0.5% by weight of free formaldehyde. When the reaction has just progressed to the point where all the free formaldehyde has been consumed, the resin is useful in the preparation of adhesive compositions as described hereinafter. However, superior adhesives result if the resin is maintained at elevated temperatures to bring about advancement which is evidenced by increases in viscosity. It is preferable to maintain the reaction mixture at a temperature of at least 70° C. (more preferably at least 80° C.) for at least one hour. If advancement is effected at lower temperatures, longer reaction times will be needed to obtain an equivalent degree of advancement.

Generally speaking, the reaction mixture should be maintained at a temperature of at least 50° C. until it attains a viscosity at least equal to that attained by an identically prepared reaction mixture maintained at 70° C. for one hour. It is most preferred that the reaction mixture be heated to reflux and maintained at reflux temperature until the viscosity and pH of the mixture have stabilized (usually 1 to 2 hours), indicating that near maximum advancement has been attained.

ADHESIVES

The AFR resins described above make up the first component of the adhesives of this invention. The second component is a curing agent or hardener which is preferably an alkylene group donating compound such as formaldehyde, formaldehyde-forming compounds (e.g., polyoxymethylene, trioxane and paraformaldehyde), and water soluble resinous condensation products containing excess formaldehyde. In some instances, diisocyanates, hydrophilic epoxides, and hydrophilic epoxide-aldehyde mixtures also can be used.

The AFR resins of this invention exhibit excellent versatility as to cure speed which can be controlled by adjustment of the pH of adhesives prepared therefrom and selection of the appropriate amount of resorcinol used in preparing the resin. Cure speed generally increases as the pH is adjusted above or below neutral and to a point, increases with increasing amounts of resorcinol. The adhesives of this invention preferably have a pH of less than 4 and more preferably less than 3.

The adhesives of this invention should be prepared immediately prior to use by blending together the AFR resin and the hardener, preferably using automatic metering-mixing-dispensing apparatus. To achieve rapid, uniform blending, the two components desirably have similar viscosities. When the pH of the adhesives is below 5, reaction between the AFR resin and hardener takes place in the absence of applied heat and the blended mixture rapidly becomes insoluble and infusible. More specifically, upon addition of the hardener, a mild exotherm occurs, and after a short period of time, the adhesives transforms from liquid to solid almost instantaneously to provide what is referred to as a "snap cure." This cure is accompanied by a noticeable color change and is noticeably exothermic. The preferred adhesives of this invention cure to an insoluble, infusible state in less than five minutes at ambient temperatures. (By "insoluble" is meant not soluble in common solvents such as water, alcohols, ketones, hydrocarbons, esters and glycols.) Heat may be applied to further decrease the required cure time.

The amount of hardener necessary to form an insoluble, infusible product will generally range from 0.05 to 2.0 parts by weight per part of AFR resin. The cure rate of the adhesives of this invention depends in part on choice of hardener, and in part on the amount of hardener employed. Thus, the use of a formaldehyde solution rather than an equivalent amount of powdered paraformaldehyde, for example, will yield a faster curing adhesive, and up to a point, cure rate will increase with increasing amounts of hardener. It should be noted that the adhesives of this invention are mass sensitive, meaning that they cure more rapidly when in large volumes than they do in the form of thin films.

The adhesives of this invention generally cure most rapidly and give superior bonds when cured at low pH, i.e., less than 3.0. However, the use of adhesives having such a low pH to bond wood members can result in gradual degradation of wood along the cured glue line when the adhesive is exposed to hydrolytic conditions, e.g., if the wood has a high moisture content at the time the adhesive is applied or if the bonded structure is subsequently exposed to a moist environment for a prolonged period. Such degradation apparently results from gradual leaching of acid from the cured adhesive and consequent hydrolysis of the wood. When bonded structures are sheared along the glue line, such degradation usually is evidenced by very low shear strengths coupled with shallow wood failure over a large percentage of the area adjacent the glue line.

Experienced indicates that a glue line pH of 3.5 is a common "safe" minimum for long-term wood stability. (ASTM D2559-66T-6.1 specifies that wood adhesives shall have a pH of no less than 2.5, while Military Specifications for Wood Adhesives, Mil.-A-397B-3.7, specifies a minimum pH of 3.5.) However, where bonded wood structures are likely to be subject to conditions of high temperature and high humidity, even higher pH's may be necessary to prevent degradation completely. In the U.S. application of G. T. Tiedeman and M. F. Gillern entitled "Adhesives Containing Metal Powders," Ser. No. 256,708, filed May 25, 1972, now U.S. Pat. No. 3,872,051 (which application is incorporated herein by reference) there is disclosed and claimed an invention which enables curing of an adhesive at a low pH, e.g., less than 3.0, and yet will result in a cured adhesive which, when subjected to hydrolytic conditions, will cause little or no wood degradation and exhibit a pH well above the "safe" minimum of 3.5 referred to above. The Tiedeman et al. invention involves incorporating into the adhesive a powdered metal, e.g., aluminum or iron. The powdered metal, which survives curing conditions, apparently functions as a "latent" acid scavenger to react with and consume hydrogen ions liberated when the adhesive is subjected to hydrolytic conditions, i.e., exposed to moisture.

The following examples are provided by way of illustration only and are not intended to be limiting of the invention. All parts and percentages are by weight unless otherwise indicated. In the following examples the results of "Block Shear Tests" on adhesives of this invention are reported in terms of "shear strength" and "% wood failure." The following procedures were employed in these tests unless otherwise indicated. A liquid adhesive was spread on the face of one of a pair of matched, longitudinally-grained Douglas fir strips (¾ in. × 2½ in. × 12 in.). The two strips were then superimposed face-to-face and clamped together at a selected pressure and for a selected time at 72° F. The resulting laminate was sawed transversely to produce five Block Shear Test specimens which were trimmed to dimensions of 1½ in. × 2 in. × 2 in. Each of these specimens was then sawed across the grain to remove one ¼ in. × ¾ in. × 2 in. strip from each lamina (the strips being removed from opposite ends of the specimen). The laminae in the resulting specimens were thus offset by ¼ in., the remaining glue line having an area of 3.0 sq. in. (1.5 in. × 2.0 in.). Two specimens were "dry" conditioned at about 70° F. and 50% relative humidity for 48 hours, and three were subjected to "wet" cyclic conditioning according to the following modification of ASTM D1101-59 (1965). The three "wet" specimens were placed in an autoclave filled with water (65° to 80° F.) so that the specimens were completely submerged. A vacuum (20 in. − 25 in. of mercury) was then applied and held for about 30 min. The vacuum was then released and air pressure of about 75 p.s.i. was immediately applied and held for about 120 min. The specimens were then placed in a forced-air drier at 150° F. and 80% − 10% relative humidity until they had returned to within 15% of original weight (about 20 to 22 hrs.). All conditioned specimens were shared at 0.05 in./min. load rate (applied to one of the off-set ends), the maximum (breaking) load (p.s.i.) for each specimen was determined and separately averaged for dry and wet specimens, and the "shear strengths" were then calculated [shear strength (p.s.i.) = max. load (lbs.) / 3.0 in.$^2$]. The percent wood failure along the glue line was estimated for each specimen and averaged for dry and wet specimens.

Also reported in Example 1 is the result of a "Resin Stroke Cure Test." In this test, one ml. of a resin is applied to a 4 sq. in. area of a hotplate preheated to 150° C. The resin is stroked with a metal spatula until it cures (or until it is apparent that curing will not occur) and the time between application and curing is measured.

EXAMPLE 1 a. AF resin having a $F_t/A$ ratio of 4

A 5-gallon reactor was charged with 17,180.5 g. formaldehyde (49.9%); 1,236.1 g. water; and 4,173.1 g. acetone. The temperature of the reaction mixture was raised to 40° C. and 45.2 g. sodium hydroxide (49.7%) was added with stirring. The solution was then cooled to 30° C. and an additonal 45.2 g. sodium hydroxide (49.7%) was added with continued stirring. The temprature of the reaction mixture was then raised to 65° C. in 60 min. at a uniform rate. No heating was required above 36° C; occasional cooling was applied to control the exotherm. The reaction mixture was maintained at 65°–70° C. for 20 min. and was then cooled to 25° C. The AF resin so produced had a free formaldehyde content of approximately 15% ($F_c/A$ = 2.3). The resin was a white syrup, had a neutral pH, and exhibited excellent stability.

b. AFR resin having an A:$F_t$:R ratio of 1:4:3.8

A 4-liter reactor was charged with 890.0 g. methanol and the temperature was adjusted to 30° C. With agitation at 30° C. there was added 1,777.6 g. resorcinol heating being applied at the start of resorcinol addition. The temperature of the reaction mixture was brought to 60° C. as rapidly as possible. At 60° C. the resorcinol was completely dissolved and there was then added 1,332.4 g. of the AF resin of Example 1(a) ($F_t/R$ = 0.44). The temperature of the reaction mixture dropped with the above addition. The mixture was then heated to and maintained at reflux (about 89° C.) for 2 hrs. and was then cooled to 25° C. The resulting AFR resin had a Gardner viscosity of "$A_2A_3$" (meaning "between $A_2$ and $A_3$") and a pH of 4.89 at 25° C. The resin was a clear, reddish, syrupy material infinitely dilutible with water, contained no free formaldehyde and was strong stable for at least 6 months.

c. A 100 ml. reactor was charged with 95.7 grams of the AFR resin of Example 1(b). The temperature of the resin was adjusted to 25° C. whereupon the resin was thickened by adding with vigorous agitation 2.4 grams of a hydroxyethyl cellulose ("Cellosize QP 40 (High)" — Union Carbide Corp.) having a 0.9 to 1.0 degree of substitution, a 1.6 to 2.0 mole substitution of ethylene oxide and a 2% solution LVT Brookfield viscosity of 70 to 110 cps. at 25° C. in the L range. After the hydroxyethyl cellulose had been thoroughly wetted, there was added with vigorous agitation 1.9 g. HCl (35%). After thorough mixing, the resin was heated to and maintained at 45° C. for 30 min. and then cooled to 25° C. The resulting resin formulation had a Gardner viscosity of "$Z_5Z_6$" at 25° C., a pH of 2.5; a resin stroke cure at 150° C. of greater than 25 min.; and a gel time at 20° C. of more than 6 months.

d. A Hardner (I) was prepared by mixing together the following ingredients in the order recited: 64.23 g. "U.F. 85"; 21.15 g. ethanol-formaldehyde solution (50%); 3.54 g. aluminum powder (U.S.P.; less than 40 mesh); 6.43 g. walnut shell flour; and 4.65 g. pyrogenic silica. "U.F. 85" (available from Allied Chemical Corp.) is a concentrated urea-formaldehyde resin precursor containing an excess of free formaldehyde and about 15% water. The ethanol-formaldehyde solution was prepared by adding 55.71 parts of paraformaldehyde flakes (95% analysis) to 44.24 parts ethanol (95%) and 0.05 parts 50% NaOH with agitation, heating the mixture to reflux (97° C.) and maintaining it at reflux for 5 min. Thirty grams of the resin of Example 1(c) and fifteen grams of Hardener I were stirred at 25° C. in a small beaker using a wooden tongue depressor. Stirring was continued until hardening of the resulting adhesive occurred. The elapsed time from initial mixing to hardening ("pot life") was 30 seconds. When spread as a thin film, the pot life of the adhesive increases to 5 to 6 min. Two parts of the resin of Example 1(c) and one part of Hardner I were obtained and the resulting adhesive was immediately spread on Douglas fir sheets (6 in. × 8 in. × ¼ in.) and pairs of the sheets were then clamped together at 150 psi for 3 hrs. to produce 2 billets (6 in. × 8 in. × ½ in.). Each of the billets was sawed to form six specimens, each being approximately 1 in. × 3½ in. × ½ in. One set of specimens was dry conditioned and one set was wet conditioned, as described previously, and the specimens were then sheared. Average shear strength (p.s.i.)/% wood failure values for the dry and wet conditioned billets were 575/100 and 487/98, respectively.

EXAMPLE 2 a. High solids content AF resin having a $F_t/A$ ratio of 4

A four-liter reactor was charged with 2,212.1 g. formaldehyde (49.8%); 837.7 g. paraformaldehyde flakes (93.0%); 14.1 g. water; and 915.5 g. acetone. The temperature of the reaction mixture was adjusted to 40° C. whereupon 9.9 g. sodium hydroxide (49.7%) was added with stirring. An exotherm resulted causing the temperature to increase to 65° in 20 min. The exotherm subsided after an additional 20 min., and the reaction mixture was then cooled to 40° C. whereupon 4.9 g. sodium hydroxide (49.7%) was added. After 12 min. the reaction mixture was cooled from 44° C. to 30° C. and an additional 5.0 g. sodium hydroxide (49.7%) was added. The reaction mixture was then heated to 65° in one hour at a uniform rate. No observable exotherm occurred. The reaction mixture was maintained at 65°–70° C. for 20 min. and was then cooled to 25° C. The resin had a final Gardner viscosity of "$A_2$" and a free formaldehyde content of approximately 16% ($F_c/A = 2.6$).

b. High solids content AFR resin having A:$F_f$:R ratio of 1:4:3.8

A one-liter reactor was charged with 375.9 g. of the AF resin of Example 2(a). Heating and agitation were applied, bringing the temperature to 60° C. as rapidly as possible, whereupon there was added 624.1 g. crystalline resorcinol ($F_f/R = 0.35$). The resorcinol was added slowly, maintaining the temperature between 50° and 60° C. After addition of all the resorcinol, the temperature was allowed to rise to reflux over a 15 min. period with heating being required until the resorcinol had completely dissolved (at approximately 75° C.). A mild exotherm was noted at 75° C. and the temperature increased to reflux (110° C.), intermittent cooling being necessary during the temperature rise from 75° C. to 100° C. The reflux was maintained for two hours, and the resulting AFR resin was cooled to 25° C. the resin had a Gardner viscosity of "VW" at 25° C. had a pH of 4.6; and consisted of 74.6% nonvolatiles.

c. To 3000 g. of "Methyl Formacel" a (50% solution of formaldehyde in methanol available from Celanese Corporation) heated to 50° C. was added "Klucel M" (a cellulose derivative available from Hercules, Inc.) in 2- to 3- gram increments, each increment being thoroughly dissolved before the next was added. Additons were continued (totaling 29 g.) until the mixture had obtained a Gardner viscosity of "U" at 25° C. The resulting Hardner (II) was then cooled to 25° C.

d. The pH of 10 parts of the AFR resin of Example 2(b) was adjusted to approximately 2.5 by adding thereto 0.4 parts of a 25% aqueous p-toluene sulfonic acid solution. The pot life of an adhesive prepared by combining 31.2 g. of the acidified resin and 15 g. of Hardener II of Example 2(c) was approximately 2 min. (at 25° C.). Block Shear Test specimens were prepared as described previously using an adhesive prepared by combining 10.4 g. of the acidified resin and 5 g. of Hardner II. The adhesive was spread at a rate of 60 lbs. per 1000 sq. ft., and the laminate from which the specimens were cut was clamped at a pressure of 150 p.s.i. for 40 min. at 70° F. and 65% relative humidity. The average shear strength (p.s.i.)/% wood failure values for the dry- and wet-conditioned specimens were 1840/85 and 810/98, respectively.

What is claimed is:

1. A liquid, hydrophilic, 2-stage resin composition produced by reaction of (1) an aceton-formaldehyde resin, (2) free formaldehyde, and (3) resorcinol in an aqueous solution at a temperature of at least 50° C. at least until substantially all said free formaldehyde is consumed, the molar quantities of chemically combined acetone, A, and formaldehyde, $F_c$, in the acetone-formaldehyde resin and the molar quantities of free formaldehyde, $F_f$, and resorcinol, R, satisfying the equations $F_c/A = 1.5$ to 3.0, $F_f/R = 0.2$ to 1.2 and $R/A = 3.0$ to 5.0.

2. A composition of claim 1 wherein $F_f/R = 0.3$ to 1.0.

3. A composition of claim 2 wherein $R/A = 3.5$ to 4.5.

4. A composition of claim 2 wherein $F_c/A = 1.8$ to 2.7.

5. A composition of claim 4 wherein $R/A = 3.5$ to 4.5.

6. A composition of claim 2 wherein $F_c/A = 2.0$ to 2.5.

7. A composition of claim 6 wherein $R/A = 3.5$ to 4.5.

8. A composition of claim 1 wherein $F_f/R = 0.4$ to 0.8.

9. A composition of claim 8 wherein $R/A = 3.5$ to 4.5.

10. A composition of claim 8 wherein $F_c/A = 1.8$ to 2.7.

11. A composition of claim 8 wherein $R/A = 3.5$ to 4.5.

12. A composition of claim 8 wherein $F_c/A = 2.0$ to 2.5.

13. A composition of claim 12 wherein $R/A = 3.5$ to 4.5.

14. A composition of claim 1 wherein $F_c/A = 1.8$ to 2.7.

15. A composition of claim 1 wherein $F_c/A = 2.0$ to 2.5.

16. A composition of claim 1 wherein $R/A = 3.5$ to 4.5.

17. A composition of claim 1 wherein said solution is maintained at a temperature of at least 70° C. for at least one hour.

18. A composition of claim 1 wherein the solution is maintained at a temperature of at least 80° C. for at least one hour.

19. A composition of claim 1 wherein said solution is maintained at a temperature of at least 50° C. until it attains a viscosity at least equal to that which it would have attained had it been maintained at 70° C. for one hour.

20. A liquid adhesive comprising:
 a liquid, hydrophilic, 2-stage resin composition produced by reaction of (1) an acetone-formaldehyde resin, (2) free formaldehyde, and (3) resorcinol in an aqueous alkaline solution at a temperature of at least 50° C. at least until substantially all said free formaldehyde is consumed, the molar quantities of chemically combined acetone, A, and formaldehyde, $F_c$, in the acetone-formaldehyde resin and the molar quantities of free formaldehyde, $F_f$, and resorcinol, R, satisfying the equation $F_c/A = 1.5$ to 3.0, $F_f/R = 0.2$ to 1.2 and $R/A = 3.0$ to 5.0; and
 a curing agent reactable with said resin composition at 25° C., the amounts of said resin composition and curing agent and the pH of the adhesive being such that said adhesive becomes insoluble and infusible at an ambient temperature of 25° C.

21. An adhesive of claim 20 wherein said curing agent comprises an alkylene group donor.

22. An adhesive of claim 20 wherein said curing agent comprises formaldehyde or a formaldehyde-forming compound.

23. An adhesive of claim 20 having a pH of less than 4.0.

24. An adhesive of claim 20 having a pH of less than 3.0.

25. An adhesive of claim 20 wherein $F_f/R = 0.3$ to 1.0.

26. An adhesive of claim 25 wherein $R/A = 3.5$ to 4.5.

27. An adhesive of claim 25 wherein $F_c/A = 1.8$ to 2.7.

28. An adhesive of claim 27 wherein $R/A = 3.5$ to 4.5.

29. An adhesive of claim 25 wherein $F_c/A = 2.0$ to 2.5.

30. An adhesive of claim 29 wherein $R/A = 3.5$ to 4.5.

31. An adhesive of claim 20 wherein $F_f/R = 0.4$ to 0.8.

32. An adhesive of claim 31 wherein $R/A = 3.5$ to 4.5.

33. An adhesive of claim 31 wherein $F_c/A = 1.8$ to 2.7.

34. An adhesive of claim 33 wherein $R/A = 3.5$ to 4.5.

35. An adhesive of claim 31 wherein $F_c/A = 2.0$ to 2.5.

36. An adhesive of claim 35 wherein $R/A = 3.5$ to 4.5.

37. An adhesive of claim 20 wherein $F_c/A = 1.8$ to 2.7.

38. An adhesive of claim 20 wherein $F_c/A = 2.0$ to 2.5.

39. An adhesive of claim 20 wherein $R/A = 3.5$ to 4.5.

40. An adhesive of claim 20 wherein said solution is maintained at a temperature of at least 70° C. for at least one hour.

41. An adhesive of claim 20 wherein the solution is maintained at a temperature of at least 80° C. for at least one hour.

42. An adhesive of claim 20 wherein said solution is maintained at a temperature of at least 50° C. until it attains a viscosity at least equal to that which it would have attained had it been maintained at 70° C. for one hour.

43. A method of preparing a liquid, hydrophilic, 2-stage resin composition comprising reacting (1) an acetone-formaldehyde resin, (2) free formaldehyde, and (3) resorcinol in an aqueous solution at a temperature of at least 50° C. at least until substantially all said free formaldehyde is consumed, the molar quantities of chemically combined acetone, A, and formaldehyde, $F_c$, in the acetone-formaldehyde resin and the molar quantities of free formaldehyde, $F_f$, and resorcinol, R, satisfying the equations $F_c/A = 1.5$ to 3.0, $F_f/R = 0.2$ to 1.2 and $R/A = 3.0$ to 5.0.

* * * * *